United States Patent [19]

Maker et al.

[11] 3,907,741

[45] Sept. 23, 1975

[54] NONAQUEOUS DISPERSIONS OF THERMOSETTING FILM FORMING POLYMERS

[75] Inventors: David L. Maker; Stephen C. Peng, both of Rochester; David M. Thomson, Mount Clemens, all of Mich.

[73] Assignee: Ford Motor Company, Dearborn, Mich.

[22] Filed: Aug. 6, 1973

[21] Appl. No.: 385,505

Related U.S. Application Data

[63] Continuation-in-part of Ser. No. 240,789, April 3, 1972, abandoned, which is a continuation-in-part of Ser. No. 82,130, Oct. 19, 1970, abandoned.

[52] U.S. Cl. ... 260/33.6 UA; 260/33.6 R; 260/34.2; 260/851
[51] Int. Cl.[2] ..... C08J 3/08; C08J 3/10; C08K 5/01; C08L 61/28
[58] Field of Search ....... 260/33.6 UA, 34.2, 33.6 R

[56] References Cited
UNITED STATES PATENTS

| | | | |
|---|---|---|---|
| 3,365,414 | 1/1968 | Fisk et al. | 260/33.6 UA |
| 3,640,931 | 2/1972 | Clarke et al. | 260/33.6 UA |
| 3,652,472 | 3/1972 | Clarke et al. | 260/33.6 UA |
| 3,736,279 | 5/1973 | Camelon et al. | 260/33.6 R |
| 3,814,720 | 6/1974 | Maker et al. | 260/34.2 |
| 3,814,721 | 6/1974 | Maker et al. | 260/34.2 |
| R27,151 | 6/1971 | Hicks | 260/33.6 UA |

OTHER PUBLICATIONS

Lee et al., "Epoxy Resins," 1957, p. 158.

Primary Examiner—Allan Lieberman
Attorney, Agent, or Firm—Olin B. Johnson; Keith L. Zerschling

[57] ABSTRACT

An active ethenic monomer having a functional epoxy group but free of functional hydroxy groups is copolymerized with another active ethenic monomer free of functional hydroxy groups in the presence of an alkylated amino resin dissolved in a nonaqueous medium. The polymerization can be carried out at the reflux temperature of the mixture and produces a stable dispersion of a polymeric material that is insoluble in the nonaqueous medium. Thermosetting films having an excellent combination of protective and decorative properties can be produced from the dispersions.

8 Claims, No Drawings

3,907,741

NONAQUEOUS DISPERSIONS OF THERMOSETTING FILM FORMING POLYMERS

SUMMARY OF THE INVENTION

This application is a continuation-in-part of U.S. patent application Ser. No. 240,789, filed Apr. 3, 1972 and now abandoned, which in turn is a continuation-in-part of U.S. patent application Ser. No. 82,130, filed Oct. 19, 1970 and now abandoned. The subject matter of this application relates to U.S. Pat. No. 3,736,279 which issued from U.S. patent application Ser. No. 240,790, filed Apr. 3, 1972, which was a continuation-in-part of U.S. patent application Ser. No. 82,131, filed Oct. 19, 1970 and now abandoned.

Nonaqueous dispersions of film forming polymers have been developed in recent years in attempts to improve the efficiency of applying protective or decorative coatings to a variety of objects such as vehicle bodies and other vehicle components. Such dispersions can carry a greater percentage of solids than the previously used solutions and thus reduce the amount of lost volatiles. The dispersions also reduce the number of coats necessary to obtain desired film thicknesses.

Preparing nonaqueous dispersions capable of producing thermosetting films is a difficult task, however. Polymerization can be carried out only within a relatively narrow temperature range and the beginning solutions must be heated to this range to initiate the polymerization reactions, but once polymerization begins, the reactions become exothermic and temperatures can rise rapidly to the point where the resulting dispersion must be discarded.

This invention provides a nonaqueous dispersion of a film forming polymer that can be produced by polymerizing the starting materials at more easily controlled temperatures. The dispersed particles contain epoxy functional groups that react during final film curing to produce hard, durable protective coatings. Dispersions having higher solids can be produced and the dispersions can be applied by spraying, roll coating, curtain coating or other techniques to produce durable, glossy films suitable for vehicle bodies and numerous other applications. The dispersion consists essentially of at least two active ethenic monomers, both free of functional hydroxy groups and one of which has a functional epoxy group, that have been copolymerized in a solution of an alkylated amino resin. Nonaqueous solvents used to make the initial resin solution are selected so the resulting polymerization product is insoluble therein; the solvents thus serve also as the dispersion medium for the dispersion.

Active ethenic monomers useful in the invention are monomers readily polymerized by free radical initiators. Such monomers preferably have an activating group near the carbon-carbon double bond. Typical activating groups are esterified carboxyl radicals such as those found in methyl acrylate, methyl methacrylate, ethyl acrylate, ethyl methacrylate, butyl acrylate, butyl methacrylate, propyl acrylate, propyl methacrylate, 2-ethylhexyl acrylate; substitutions such as chloride and acetate radicals such as those in vinyl chloride, vinylidene chloride and vinyl acetate; the other double bonds of aromatic monomers such as styrene, alpha methyl styrene and vinyl toluene; cyano radicals such as in acrylonitrile and methacrylonitrile; and amino carboxyl radicals as in acrylamide. Ethenic monomers having less than about 12 carbon atoms react more effectively and produce dispersions having better stability and final film properties. The methacrylic monomers usually can have a larger number of carbon atoms than acrylic monomers.

Useful active ethenic monomers having a functional epoxy group include 2,3-epoxypropyl methacrylate, 2,3-epoxypropyl acrylate, 3,4-epoxybutyl acrylate, epoxidized cyclohexylmethyl methacrylate, 4-epoxyethyl styrene, 5,6-epoxyhexyl acrylate, 3-phenyl 2,3-epoxypropyl acrylate, 3-phenyl 2,3-epoxypropyl methacrylate and other epoxyalkyl acrylates and methacrylates. The epoxy functional monomer usually makes up about 5 to 40 weight percent of the total ethenic monomer content in the resultant dispersion. Best final film strength, adhesion and gloss are achieved when the epoxy functional monomers make up about 10 to 20 weight percent of the total ethenic monomer content.

Mixtures of several active ethenic monomers are used to produce a combination of final film and dispersion properties. Acrylonitrile preferably forms up to 40 weight percent of the combined ethenic monomers because its dispersions are highly stable. Acrylic and methacrylic acids in amounts no greater than about 5 weight percent of the combined ethenic monomers can be included as built-in catalysts for final film curing. The amount of these acids preferably is kept below 3 weight percent to prevent significant participation in the dispersion forming reactions.

Useful alkylated amino resins include the resins prepared by condensation of an amine and an aldehyde in the presence of an alkanol. Melamine-formaldehyde condensation products having alkyl groups from methanol, ethanol, propanol, butanol and higher alcohols up to and including lauryl alcohol produce excellent final film properties. Alkylated ureaformaldehyde also can be used. These resins must have good tolerance during dilution with aliphatic hydrocarbon solvents with the preferred mineral spirits tolerance exceeding about 400–500 as measured by ASTM D1198-55 at 60 percent solids in butanol. Such amino resins usually make up about 10–50 weight percent of the total polymeric dispersion solids. Best final film properties are obtained with thermosetting resins making up about 20-40 weight percent of the total polymeric dispersion solids.

Organic liquids capable of serving initially as a solvent for the ingredients and ultimately as the dispersion medium for the dispersion preferably include aliphatic distillation products such as naphthas. Aliphatic naphthas having distillation ranges above 85°C are most practical and naphthas having a distillation range of about 100°–150°C are preferred because of rapid polymerization rates at refluxing temperatures plus excellent temperature control. Aliphatic solvents with higher boiling ranges can be used with proper temperature control. Cyclohexane, cycloheptane, cyclooctane, n-octane, isooctane, nonane and other straight, branches or cyclic aliphatic hydrocarbons or mixtures also can be used.

The dispersion forming reactions are not clearly understood. A minimum reaction temperature of about 80°C is necessary along with a small amount of a free radical initiator such as benzoyl, dibutyl, dicapropyl and dicaprylyl peroxide, cumene hydroperoxide, t-butyl peroctoate, etc. It is believed that addition polymerization of the ethenic monomers physically binds the dissolved resin into the resulting insoluble particles. Some actual chemical binding or electrical attraction also might occur between the amino resin and the polymerization product of the monomers. Polymerization time varies with temperature; generally, about 3–8 hours is sufficient. By carrying out the reaction at refluxing temperature of the mixture, the inherent automatic temperature control prevents damage to the dispersion that might interfere with subsequent application techniques and final film properties.

Separate solutions of the amino resin and of the ethenic monomers usually are prepared initially. A small amount of a polymerizing initiator such as benzoyl peroxide is added to the monomer solution, which then is added slowly to heated resin solution. The ingredients are agitated constantly during the entire addition and for several hours thereafter.

Dispersions of the invention can be made with solids contents up to 60 weight percent. Paints made from the dispersions have excellent shelf life and stability, and typically have solids contents (pigments and film forming ingredients) of over 40 weight percent. Automotive topcoats can be produced by spray applications from the paints having solids as high as 60 weight percent.

Best final films result when a curing agent is added to the dispersion although useful films can be obtained without any curing agent. Useful curing agents include organometallic salt catalysts such as the naphthenates, octoates, acetates, tallates and neodecanoates of zinc, cobalt, copper, lead, manganese, zirconium and divalent tin. Dispersions containing up to about 4 weight percent of such salts (based on the weight of the polymeric solids of the dispersion) can be cured at temperatures of about 100°–150°C., and produce final films having improved hardness and solvent and acid resistance. Larger amounts of salts can be used but usually do not improve significantly the curing time or the final film properties. Organic acids such as p-toluene sulfonic acid, benzenes, sulfonic acid, other sulfonic acids, formic acid, acetic acid, propanoic acid, pentanoic acid, lauric acid, myristic acid, margaric acid, stearic acid, benzoic acid, phthalic acid, cinnamic acid, phenylacetic acid, toluic acid, salicyclic acid, gallic acid and related acids also accelerate final film curing and produce harder films having improved solvent and acid resistance. Generally, less than about 2 weight percent of such acids (based on the weight of the polymeric solids of the dispersion) achieves desired curing time, hardness, and solvent and acid resistance, and higher amounts produce relatively little improvement in those properties.

DETAILED DESCRIPTION

EXAMPLE 1

An alkylated melamine-formaldehyde condensation product is prepared by mixing 540 grams of melamine, 658 grams of butanol, 150 grams of xylene, 0.9 grams phthalic anhydride and 1,670 grams of a solution containing 40 weight percent formaldehyde, 51 weight percent butanol and 9 weight percent water. The mixture is heated to refluxing temperature for about 5–6 hours until a mineral spirit tolerance of 1,700 (ASTM D1198-55) is achieved. All water is removed during refluxing. Butanol then is removed under vacuum to provide a solids content of 70 weight percent.

Sixty-three grams of the condensation product is mixed with 305 grams of aliphatic naphtha having a distillation range of 99°–135°C. and 0.6 gram of benzoyl peroxide in a 3 neck 1 liter flask. A water condenser, thermometer and stirrer are attached to the flask and its contents are heated to refluxing under constant, high speed stirring. Refluxing and stirring are maintained during the dropwise addition of 523.6 grams of a solution of several active ethenic monomers consisting of 184 grams of methyl methacrylate, 82 grams butyl methacrylate, 80 grams butyl acrylate, 48 grams 2,3-epoxypropyl methacrylate, 6 grams acrylic acid, 40 grams of dodecanol, 80 grams of the aliphatic naphtha, and 3.6 grams benzoyl peroxide. The addition takes place over a period of about 3 hours and refluxing and stirring are continued for another 3 hours.

The resulting product is a stable milky white dispersion having a solids content of about 47 weight percent. About 2 weight percent of zinc naphthenate is added and the dispersion is applied to a metal substrate. Baking for 17 minutes at 121°C. produces a clear, tough, protective thermosetting film.

EXAMPLE 2

Example 1 is repeated except that the amount of methyl methacrylate is reduced to 172 grams and the amount of 2,3-epoxypropyl methacrylate is increased to 60 grams. A dispersion slightly more viscous than that of Example 1 resulted. Monobutyl ester of maleic acid is added to the dispersion and the mixture is cured satisfactorily into a clear protective thermosetting film following the technique of Example 1.

EXAMPLE 3

Sixty-three grams of the condensation product prepared according to the first paragraph of Example 1 is mixed with 305 grams of an aliphatic naphtha having a distillation range of 99°–135°C. and 0.4 gram of t-butyl peroctoate. The mixture is charged to the 3 neck 1 liter flask and heated with constant stirring to 100°C. to establish refluxing. With constant refluxing and stirring, 523.6 grams of an ethenic monomer solution consisting of 128 grams methyl methacrylate, 4 grams acrylonitrile, 82 grams butyl methacrylate, 80 grams butyl acrylate, 60 grams 2,3-epoxypropyl methacrylate, 6 grams acrylic acid, 40 grams of styrene, 120 grams of the aliphatic naphtha and 3.6 grams t-butyl peroctoate is added over a period of 3 hours. Refluxing and stirring are continued for another 3 hours after addition is complete.

The resulting dispersion contains about 52 weight percent solids and is more stable and uniform than the dispersions of Examples 1 and 2. Analysis indicates that the acrylonitrile increases the hardness of the polymer particles and thereby reduces agglomeration tendencies. A curing agent consisting of 1 weight percent P-toluene sulfonic acid is added and curing the mixture at 120°C. for 20 minutes yields a tough, glossy film.

EXAMPLE 4

For comparison purposes, Example 2 is repeated except that 60 grams of hydroxypropyl methacrylate is used in place of the 60 grams of 2,3-epoxypropyl methacrylate. The solution of the condensation product is heated to 70°C., and the monomer solution is added dropwise over a three hour period. External heating is stopped when addition is complete but 30 minutes thereafter the temperature has risen to 94°C. and in the next 15 minutes the temperature rises to 102°C. The resulting product is a highly viscous unmanageable mass.

EXAMPLE 5

Ninety grams of the condensation product prepared according to the first paragraph of Example 1 except that it is 60 percent solids is mixed with 44 grams of an aliphatic naphtha having a distillation range of 99°–155°C. and 0.17 grams of t-butyl peroctoate. The mixture is charged to a 3 neck 500 milliliter flask and heated to about 100°C. to establish refluxing. With constant refluxing and stirring, a solution of 48 grams methyl methacrylate, 20 grams butyl methacrylate, 15 grams acrylonitrile, 15 grams 2,3-epoxypropyl acrylate, 2 grams acrylic acid, 43 grams of the aliphatic naphtha and 1.09 grams t-butyl peroctoate is added over a period of 3 hours. Refluxing and stirring is continued for an hour after addition is complete, and then 0.037 gram of t-butyl peroctoate in 2.5 grams of the aliphatic naphtha is added. Refluxing and stirring is continued for 2 more hours.

The resulting milky white dispersion contains 55 percent solids and has a viscosity of 24.8 seconds in a number 4 Ford cup at 25°C. Increasing the acrylonitrile content to 15 percent of the ethenic monomers from the 1 percent of Example 3 produces improved stability. Adding ½ weight percent zinc naphthenate and baking about 17 minutes at 121°C. produces a glossy, durable thermosetting film. The dispersion is particularly useful for metallic enamels.

EXAMPLE 6

The procedure of Example 1 is repeated except for the difference that the alkylated melamine-formaldehyde condensation product is prepared by mixing 504 grams of melamine, 318 grams of butanol, 0.39 grams of phthalic anhydride, and 1,650 grams of a solution containing 40 weight percent formaldehyde, 51 weight percent butanol and 9 weight percent water. The mixture is heated to refluxing temperature and held at reflux while continually removing water of reaction by means of a Dean-Stark trap. After about 2 hours reaction time a mineral spirits tolerance of less than 50 (ASTM D1198-55) and a Gardner viscosity of Z+ is attained. An additional 296 grams of butanol is added to the reaction and heating is continued for 5 hours. The final product is a clear, colorless polymer of viscosity Zl⁻ Gardner, mineral spirit tolerance of 1016, for nonvolatile of 63.7 percent.

EXAMPLE 7

The procedure of Example 1 is repeated except for the difference that the alkylated-melamine-formaldehyde condensation product is prepared by mixing 340 grams of melamine, 352 grams of butanol, 0.26 grams of phthalic anhydride, and 1113 grams of a solution containing 40 weight percent formaldehyde, 51 weight percent butanol, and 9 weight percent water. The mixture is heated to refluxing temperature and held at reflux which continually removes water of reaction by means of a Dean-Stark trap. After about 6 hours reaction time at reflux the resin is cooled and filtered. The final product is a clear, colorless resin of viscosity Z Gardner, mineral spirits tolerance of 400 (ASTM D1198-55) and a nonvolatile of 60 percent.

Thus this invention provides a nonaqueous dispersion capable of forming protective and decorative thermosetting films and a process for forming such dispersions that is controlled easily under production conditions. The dispersions are particularly useful in forming final coatings on metallic vehicle bodies.

We claim:

1. A process for preparing a nonaqueous dispersion of a thermosetting film-forming polymer comprising in combination
   1. dissolving an alkylated condensation product of an amine and an aldehyde having a mineral spirits tolerance at 60 percent solids in butanol of at least about 400 in an aliphatic hydrocarbon solvent which distills at temperatures above about 85°C.
   2. adding to said solution a first active ethenic monomer having a functional epoxy group and a second active ethenic monomer in relative quantities such that the epoxy functional active ethenic monomers constitute between about 5 and about 40 weight percent of the total of ethenic monomers added, said active ethenic monomers being readily polymerizable by free radical initiated polymerization and being free of functional hydroxy groups, and
   3. copolymerizing said active ethenic monomers in the presence of said alkylated condensation product and a free radical initiator while maintaining said solution at a temperature above about 80°C. and under agitation until said active ethenic monomers form a polymeric material that is insoluble in said solvent and dispersed through said aliphatic hydrocarbon solvent in a quantity such that said alkylated condensation product constitutes about 10 to about 50 weight percent of the total polymeric solids within the resultant dispersion.

2. The process of claim 1 in which said aliphatic hydrocarbon solvent is an aliphatic hydrocarbon distillation product having a distillation range of about 100°–150°C. and in which the copolymerizing step is carried out at the refluxing temperature of the solution and resultant dispersion.

3. The process of claim 1 in which the alkylated condensation product is prepared by a condensation reaction of an amine and an aldehyde in the presence of an alkanol.

4. The process of claim 1 in which said active ethenic monomers are dissolved in a nonaqueous solvent and the resultant solution is incrementally added to said solution of said alkylated condensation product while said solution of said alkylated condensation product is maintained under agitation and at its refluxing temperature, said refluxing temperature being at least 80°C.

5. The process of claim 1 in which said active ethenic monomers have less than about 12 carbon atoms.

6. The process of claim 1 in which said second active ethenic monomer is an acrylate, methacrylate or acrylonitrile.

7. The process of claim 1 in which said second active ethenic monomer is an epoxy acrylate or an epoxy methacrylate.

8. A process for preparing a nonaqueous dispersion of a thermosetting film-forming polymer comprising in combination
   1. dissolving an alkylated condensation product of an amine and an aldehyde having a mineral spirits tolerance at 60 percent solids in butanol of at least about 400 in an aliphatic hydrocarbon solvent which distills at temperatures above 85°C.
   2. heating the resultant solution of alkylated condensation product to its reflux temperature above 80°C., maintaining said solution at reflux temperature and under agitation; and incrementally adding to said solution a first active ethenic monomer having a functional epoxy group and a second active ethenic monomer in relative quantities such that the epoxy functional active ethenic monomers constitute between about 5 and about 40 weight percent of the total of ethenic monomers added, said active ethenic monomers having less than about 12 carbon atoms per molecule, being polymerizable by free radical initiated polymerization, being free of functional hydroxy groups, and including less than 3 weight percent of ethenic monomers having functional carboxy groups, and 3. copolymerizing said active ethenic monomers in the presence of said alkylated condensation product and a free radical initiator while maintaining the solution of said alkylated condensation product containing said active ethenic monomers under agitation and at its reflux temperature above 80°C. until said active ethenic monomers form a polymeric material that is insoluble in said aliphatic hydrocarbon solvent and dispersed uniformly through said aliphatic hydrocarbon solvent in a quantity such that said alkylated condensation product constitutes about 10 to about 50 weight percent of the total polymeric solids within the resultant dispersion.

* * * * *